Nov. 10, 1936.         R. C. BENNER         2,060,017
CAST REFRACTORY AND THE PROCESS OF MANUFACTURING THE SAME
Filed April 27, 1934
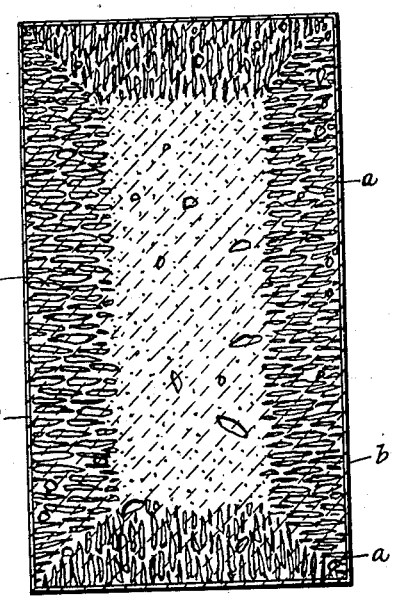
INVENTOR.
RAYMOND C. BENNER
BY *RCBenner*
ATTORNEY.

Patented Nov. 10, 1936

2,060,017

UNITED STATES PATENT OFFICE

2,060,017

CAST REFRACTORY AND THE PROCESS OF MANUFACTURING THE SAME

Raymond C. Benner, Niagara Falls, N. Y., assignor to The Carborundum Company, Niagara Falls, N. Y., a corporation of Pennsylvania Application April 27, 1934, Serial No. 722,762

13 Claims. (Cl. 49—79)

This invention relates to an improvement in crystalline cast refractory articles and to a method of their production so carried out as to render the cast product light and porous. Such a product has, for certain applications, the further advantage that its rate of heat conductivity is considerably lower than that of a solid article.

Cast refractories have a wide field of usefulness; and when properly selected for composition are resistant not only to high temperatures but also to the attack of corrosive materials. It has been proposed to cast fusions of refractory oxides to produce cast articles consisting of a crystalline structure in which there is generally at least a trace of intercrystalline glass. In producing these refractories the oxides are heated until fusion has been accomplished; and the mass in cooling crystallizes until only a residue of glass remains which solidifies in the interstices between the crystals. The solidified cast refractory articles are dense and of high specific gravity.

Lighter articles have heretofore been produced either by bonding granular refractory material and firing the bonded material; or by selecting proper granular material and sintering the granules together. The types of material which are available for sintering into a useful product are limited; and there is a limit to the usefulness of both bonded and sintered refractory articles. For instance, the bonded refractories can not be used under temperature conditions which will fuse or soften the bond. Sintered articles are sometimes weak in structure and are from their very nature porous and permeable to a considerable degree.

A product of the present invention is illustrated in the drawing, which represents a cross-section of a cast refractory article made according to the present invention.

In accordance with the invention, gas is generated within the molten refractory material; and in casting the molten mass the shell encasing the casting is quickly chilled so as to seal in the gas. I thus produce a porous crystalline refractory article having a structure of which the section shown in the figure of the drawing is typical. In this figure it will be noted that the refractory oxides (of which the fusion was composed) have formed a crystalline mass with interspersed gas openings $a$ which are considerably elongated. In casting the article, the outer shell $b$, which was initially solidified, forms a substantially imperforate skin; and as a result, the gas is sealed within the article so that as cooling progresses a subcutaneous spongy structure is formed in which the elongated gas openings extend normally to the imperforate outer skin or shell $b$. Even adjacent the corners of the brick, the gas openings of the spongy structure are elongated and extend normally to the surface of the article. This rather remarkable feature, for which I do not know the cause, is one of the attributes which distinguish this article from a sintered structure. The imperforate outer skin or shell is another feature distinguishing this article from the customary sintered product.

In accordance with the invention one method of generating gas within the molten mass is to add a gas producing substance before casting the article. Another method of producing the desired product is to employ, as a source of refractory oxides, ores or other materials which of themselves contain a gas producing substance.

Refractory articles of various compositions may be made in accordance with my invention. For certain applications, and particularly where the refractories are to be subjected to the erosive action of ferruginous coal ash in combustion furnaces, the principal constituent introduced into the fusion may be chromite. For high resistance to the erosive action of alkaline material, refractories containing a major proportion of alumina may be employed. Refractory articles made of magnesia-alumina spinel may also be made light and of a spongy structure admirably adapted to cut down the transfer of heat.

As an example of how my invention may be practiced I will give somewhat in detail the method of producing a porous crystalline refractory article in whose composition the major constituent is alumina. A suitable source of alumina is bauxite ore; and by fusing this ore in an electric furnace the impurities may be reduced to 7% or less. An addition of a gas producing substance such as ferric oxide ($Fe_2O_3$), coke, calcined gypsum ($CaSO_4$) or aluminum hydroxide ($Al(OH)_3$) is made, and the fusion poured into a mold of the shape which the desired article is to have. This mold is preferably a metallic mold such as an iron mold. The mold is sufficiently cooled to quickly encase the casting in a solidified shell, thus trapping the gas within the casting. Such cooling may be accomplished either by a water jacket or by air cooling of the metal mold. The casting may be annealed in the customary manner. The resulting product is considerably lightened in weight, cast pieces of the same volume weighing 7 pounds as compared with 12 pounds for the solid pieces.

In the example given, a definite addition substance was employed for producing the gas. It will be obvious that a source of refractory oxides may be employed which of itself contains a gas producing substance. For instance, in producing a refractory article of alumina, the fusion may be prepared by melting natural corundum. In these cases no addition of a gas producing substance is needed, as the ingredients of the mix act of themselves (either by decomposition under heat or by reaction with the carbon of the electrodes) to produce a gas. The casting of the article should be accomplished so as to encase the casting in a chilled shell of solidified material in order to prevent the escape of the gas generated.

If glazing is desirable, this may be accomplished by coating the interior of the mold with materials which, when fused, form a glaze.

The porous crystalline refractory articles produced in accordance with my invention are considerably lighter than dense solid cast articles of substantially the same composition. Generally the cost per unit volume is less. In certain installations these porous articles have the marked advantage of considerably cutting down the rate of heat transfer through the refractory. These advantages are obtained without making it necessary that the refractory be porous at the surface as well as in the interior, and therefore the refractory need not be substantially more permeable than are the dense solid cast refractories.

I claim:

1. A porous crystalline refractory article composed of refractory oxides and penetrated beneath a substantially imperforate outer shell by elongated gas openings.

2. A porous crystalline refractory article composed of refractory oxides and having a subcutaneous spongy structure in which elongated gas openings extend normally to the surface of the article.

3. A porous crystalline refractory article composed of refractory oxides and having a substantially imperforate outer shell with a porous structure under the shell, the pores being elongated.

4. A porous crystalline refractory article composed of refractory oxides and having a substantially imperforate outer shell with a porous structure under the shell, the pores being elongated and extending normally to the outer shell.

5. A porous crystalline refractory article composed of refractory oxides and having a subcutaneous spongy structure enclosed within a substantially imperforate skin or shell.

6. The method of producing refractory articles which comprises forming a fusion of refractory oxides capable of solidifying to a crystalline state, causing generation of gas within the fusion, casting the fusion, chilling the casting to quickly encase it in a solidified crystalline shell whereby a substantial volume of gas is entrapped in the casting, and further cooling the said casting to solidify it in the crystalline state.

7. The method of producing articles which comprises forming from refractory material a fusion capable of solidifying to a crystalline state, adding to the fusion a gas-producing substance, casting the fusion, chilling the casting to quickly encase it in a solidified crystalline shell whereby a substantial volume of gas is entrapped in the casting, and further cooling the said casting to solidify it in the crystalline state.

8. The method of producing refractory articles which comprises forming from refractory material containing a major proportion of refractory oxides a fusion capable of solidifying to a substantially crystalline state, causing the generation of gas within the fusion, casting the fusion, chilling the casting to quickly encase it in a solidified crystalline shell whereby a substantial volume of gas is entrapped in the casting, and further cooling the said casting to solidify it in the crystalline state.

9. The method of producing refractory articles which comprises forming from refractory material a fusion capable of solidifying to a substantially crystalline state, causing the generation of gas within the fusion, casting the fusion, chilling the casting to quickly encase it in a solidified crystalline shell whereby a substantial volume of gas is entrapped in the casting, and further cooling the said casting to solidify it in the crystalline state.

10. The method of producing refractory articles which comprises forming from refractory material containing a major proportion of alumina a fusion capable of solidifying to a crystalline state, causing the generation of gas within the fusion, casting the fusion, chilling the casting to quickly encase it in a solidified crystalline shell whereby a substantial volume of gas is entrapped in the casting, and further cooling the said casting to solidify it in the crystalline state.

11. The method of producing refractory articles which comprises forming from refractory material containing a major proportion of chromite a fusion capable of solidifying to a crystalline state, causing the generation of gas within the fusion, casting the fusion, chilling the casting to quickly encase it in a solidified crystalline shell whereby a substantial volume of gas is entrapped in the casting, and further cooling the said casting to solidify it in the crystalline state.

12. The method of producing refractory articles which comprises forming from refractory material containing a major proportion of refractory oxides a fusion capable of solidifying to a crystalline state, causing the generation of gas within the fusion, casting the fusion into a metallic mold while there is a substantial volume of gas within the fusion whereby the casting is chilled to quickly encase it in a solidified crystalline shell, and further cooling the said casting to solidify it in the crystalline state.

13. A method of producing refractory articles which comprises forming from refractory material containing a major proportion of refractory oxides a fusion capable of solidifying to a substantially crystalline state, adding to the fusion sufficient iron oxide to cause the generation of a substantial volume of gas within the fusion, casting the fusion, chilling the casting to quickly encase it in a solidified crystalline shell, whereby a substantial volume of gas is entrapped in the casting, and further cooling the said casting to solidify it in the crystalline state.

RAYMOND C. BENNER.